United States Patent Office 3,163,614
Patented Dec. 29, 1964

3,163,614
METHOD OF PREPARING LIGNIN-RUBBER CO-PRECIPITATE AND PRODUCT
Mitchell S. Dimitri, Westwood, Charleston, S.C., assignor to West Virginia Pulp and Paper Company, New York, N.Y., a corporation of Delaware
No Drawing. Filed Nov. 14, 1960, Ser. No. 68,631
9 Claims. (Cl. 260—17.5)

This invention relates to an improved method of preparing lignin-rubber coprecipitate and to the improved lignin-rubber coprecipitate obtained thereby.

Lignin has long been known to be a very effective reinforcing agent for rubber when incorporated therein by a coprecipitation process. The method employed in coprecipitating the lignin and latex and the excellent rubber properties which can be obtained by this method are well shown in the U.S. patent to Pollak, Number 2,608,537. Although many advantages are obtainable by reinforcing rubber with lignin through the coprecipitate process, several disadvantages inherent in this process have limited any large scale commercial use of lignin as a reinforcing agent of rubber. The primary disadvantage of the coprecipitate process has been the physical characteristics of the lignin-rubber coprecipitate. The lignin-rubber coprecipitate as normally produced has the nature of paste or mud, which is difficult to filter and wash in order to remove the supernatant fluid in which the coprecipitation is carried out. When this pasty or muddy coprecipitate is filtered it yields a silt-like material which has very little cohesion. This material, due to the lack of cohesion between the silt-like particles, is very difficult to handle and contains a very high percentage of bound water. The solids of normal coprecipitate which has been filtered, washed and dewatered, generally run only about 25 to 35%. This may be compared with normal rubber crumb obtained by coagulation of rubber latex which contains 60 to 70% solids. Consequently, while coagulated rubber requires the drying of only about ½ to ⅔ pound of water per pound of rubber solids, the lignin-rubber coprecipitate crumb requires the drying of 2 to 3 pounds of water per pounds of lignin-rubber solids. This results in an increase in the drying necessary for lignin-rubber coprecipitate as compared to normal rubber crumb. The result of this increased drying is to considerably slow down the rubber processing operation and to greatly increase the processing cost for heat used in drying. This drying factor alone has consequently acted as a deterrent to the use of lignin as a reinforcing agent for rubber.

Some progress has been made in solving the problems caused by the physical characteristics of the lignin-rubber coprecipitate. Patents 2,844,548 to Haxo et al. and 2,844,549 to Provost disclose processes whereby the coprecipitate which is obtained is more easily filterable. While being a step forward they, unfortunately, have not solved the entire problem. The coprecipitate obtained by these processes is still of a sandy, grit-like nature and contains on the order of only 35% solids. It is toward producing a much higher solids content coprecipitate crumb which is more easily handleable and of a more rubber like nature, to which this invention is directed.

I have found that by initially coprecipitating the lignin with only a portion of the total latex to be used, heating the slurry of lignin-rubber particles obtained from the initial coprecipitate to a temperature above 170° F. and then adding this slurry after heating to additional latex and coagulating this latex, that a lignin coprecipitate crumb of solids content in the range of 40 to 65% can be produced. By employing the additional step of removing a substantial portion of the supernatant fluid contained in the slurry after it has been heated and prior to addition of the slurry to the additional latex, not only are the solids increased but the entire nature of the coprecipitate is changed markedly. This crumb is wholly unlike that of the grit-like or sandy crumbs obtained with normal coprecipitation processes, and is very similar in feel, elasticity, and appearance to a normally coagulated rubber crumb.

In carrying out the present invention, a normal lignin-rubber coprecipitate is prepared. This initial coprecipitate, however, differs from normal processes in that only a portion of the total latex to be reinforced by the lignin is employed. With the exception of this fact, the process employed for this coprecipitation may be very similar to that shown by the prior art and particularly the above cited patent to Pollak. It has been found that in the practice of this invention that from 5 to 95% of the total rubber solids to be reinforced by the lignin may be employed in this initial coprecipitation. However, it appears that lower physical properties in the final cured reinforced rubber result from the use of less than 50% of the rubber in the initial coprecipitation and poorer quality crumbs having somewhat decreased elasticity and cohesiveness result from the use of greater than 90% of the rubber in the initial coprecipitation. For these reasons it is preferred practice to employ between about 50 and 90% of the rubber in the initial coprecipitation.

This initial coprecipitation can be accomplished through the use of acids, polyvalent metallic salts such as zinc chloride, calcium chloride, magnesium sulfate, alum, etc., or by a combination of acid and metallic salts. As will be explained more fully hereinafter, the use of the metallic salts has certain advantages in that they make the lignin more resistant to the effects of temperature. When employing acid the pH for this coprecipitate should be between about 1 and 5, and preferably from about 2 to 3. It has been found that the lower the pH the higher the solids of the final crumb will be, however, too low a pH makes the final crumb a little more difficult to wash and filter and may cause deterioration of the rubber during drying. In this regard, the pH's between 1 and 2 are somewhat border-line and pH's below 1 are generally unsatisfactory. When employing salts for coprecipitation, the particular salt employed will determine the pH which may be as high as 8.0 or as low as about 3.0.

The temperature of this initial coprecipitation also affects the properties of the lignin-rubber crumb. In general, if this coprecipitation is carried out at high temperatures above about 170° F., the final crumb tends to have a lower solids content. It has been found that the lower the temperature of coprecipitation the higher the solids content of the resultant crumb. Preferably, the coprecipitation should be carried out at temperatures below 150° F. for this reason. Apparently, coprecipitate produced at higher temperatures tend to form well dispersed slurries of very fine particles. For the purpose of this invention, these fine dispersions are more difficult to agglomerate during the later heat treatment process and are consequently generally not desirable.

Following the initial coprecipitation of the lignin with the latex, the slurry of lignin-rubber particles is heated to a temperature above 170° F. In general, when employing any given lignin, the higher the heat treatment temperature the higher will be the solids content of the crumb which is obtained from this process. However, certain other factors influence the temperature to be used and must be taken into consideration. Primarily among these factors is the effect of the heat on the lignin in the slurry. Although normal kraft lignins have a fusion temperature when dry in the neighborhood of 320 to 410° F., when these lignins are in an aqueous medium the fusion temperature of the lignin is very substantially reduced to within the neighborhood of 150 to 180° F. Consequently heating of the lignin-rubber particles to a temperature above the point at which these particles will fuse while in an aqueous medium results in the aggregation of the minute lignin particles into particles of such a large size that the reinforcing properties of the lignin are severely affected. As a result the properties of the final cured rubber are lowered. In order to prevent any serious reduction of the properties of the final cured rubber, it is consequently necessary that the heat treatment either be conducted at low temperatures or that the lignin employed have a high heat resistance. Lignins of increased heat resistance can be prepared by oxidation, by reaction with formaldehyde, by reaction with a phenolic resin resole, by demethylation, or by use of metallic salts for coprecipitating the lignin with the rubber. Heat resistant demethylated lignins can be produced by recovering lignin from black liquor which has been treated according to the disclosure of U.S. Patents Re. 24,293 and 2,816,832. The oxidized lignins can be produced by passing air through alkaline solutions of lignin at elevated temperatures. Preparation of oxidized lignins are shown in Raff et al. 2,610,954. Formaldehyde and resole reacted lignins can be prepared by coprecipitating the lignin and latex with the formaldehyde or resole. It will usually be desirable in producing the resole or formaldehyde reacted lignins to heat the lignin with the formaldehyde or resole in an alkaline solution before precipitation to permit greater reaction to occur. The formaldehyde reacted lignins may also be prepared by adding the formaldehyde to the lignin-rubber coprecipitate slurry prior to the heating step. Reaction under the acid conditions will occur very rapidly in such a case.

In general, the slurry of formaldehyde and resole reacted lignin-rubber particles should be heat treated at temperatures between 180 and 195° F., the slurry of oxidized lignin-rubber particles between 190 and 240° F., depending on the degree of oxidation, and the slurry of metallic salt precipitated lignin-rubber particles between 240 and 270° F. In general, the temperature which the slurry of lignin-rubber particles is heated should be as high as possible, consistent with the heat resistance of the lignin. By following this practice, a coprecipitate crumb will be obtained of the highest possible solids content where not affecting the properties of the final cured lignin reinforced rubber. Under proper control, the heat treatment of the slurry will actually tend to increase modulus of the final cured rubber. Some slight increase followed by a slight decrease in tensile strength may also be noted upon increasing the temperature of heat treatment until such time as the critical temperature of the lignin is reached at which the substantial fusion of the lignin in the slurry occurs. The critical temperature for any particular type of lignin which is to be employed can easily be determined by running a series of coprecipitations according to this invention in which the temperature to which the slurry is heated is varied. By compounding and curing the series of coprecipitates and testing the cured rubber for tensile strength a plot can be made of tensile strength against temperature of heat treatment. Unless the lowest heat treatment temperature employed was above the critical temperature of the lignin, a curve should be obtained in which the tensile strength increases and then decreases very slightly with increasing heat treatment temperature until a heat treatment temperature is reached at which the tensile strength falls off very sharply. The very sharp fall-off of tensile strength generally occurs after the tensile strength has slowly decreased to about 80% of the maximum tensile strength and this point is considered herein to be the critical temperature. Up until this point it appears that only limited fusion of the lignin has occured while beyond this point very substantial fusion of the lignin appears to occur and nearly all the properties of the rubber (with the exception of modulus which continues to increase upon increasing of the temperature) are seriously affected.

A second factor which influences the temperature to which the slurry should be heated is that the temperature to which the slurry is raised must not only be above about 170° F. but should also be about 10 to 15° F. or more above the temperature at which coprecipitation ocurred, i.e., the temperature of the slurry immediately after coprecipitation. Unless the temperature of the slurry is raised by at least 10° F. agglomeration of the lignin-rubber particles does not occur. Preferably heating of the slurry should be carried out so as to raise the temperature by at least 25° F. above the coprecipitation temperatures and most preferably an even greater increase in the temperature is desirable.

Heating of the slurry of lignin-rubber coprecipitate particles should be accomplished under conditions at which very little agitation is caused to occur. The heating may very effectively be accomplished by the passage of heated steam through the slurry. If carefully controlled, the heating with steam will cause only slight agitation of the slurry while providing very uniform heating of the slurry. Other methods of heating may obviously be used; however, care in the use of these methods must be taken to assure uniform heating of the slurry without the use of a high degree of agitation. Where the slurry is to be heated at temperatures above the boiling point of the slurry, it is obvious that some type of pressure system must be employed. During the heat treatment process, a very marked change in the character of the lignin-rubber coprecipitate particles occurs. The very fine particles originally obtained agglomerate together to form and produce a particulate entity which settles very rapidly. It also appears that the heating affects the degree of hydration of the lignin by driving off a great deal of the water normally bound by the lignin.

After the heat treatment step it is preferable that a large portion of the supernatant liquid be removed. As the agglomerated lignin-rubber particles after the heat treatment settle out very rapidly, and are easily filtered, the liquid can be easily removed either by decantation or by filtration. For best results, about 55 to 100% of the supernatant liquor should be removed, however removal of 35% or more of the liquid is beneficial. The primary reason for the removal of this liquid is to prevent the formation of the muddy, silt-like crumb normally associated with normal lignin-rubber coprecipitate crumbs. The removal of the liquid causes a marked change in the characteristics of the final crumb by aiding in the formation of large particulate masses of lignin and rubber which are very cohesive and rubbery and elastic in nature. The present invention however can be carried out without removing any of the supernatant liquid and while the advantages of the easily handled crumb are not obtained, a higher solids coprecipitate crumb is obtained.

The next step in the process comprises the addition of the heat treated slurry of lignin-rubber coprecipitate particles to additional latex. As the slurry is still fairly acid, at least a portion of the latex will be immediately coagulated on the surface of the previously coprecipitated particles. If all the latex in this step is not coagulated in the slurry, any coagulating aids such as acids, salts, or organic coagulants may be employed to coagulate the remaining latex. In addition, the supernatant liquid removed from the slurry after heating may be readded to the mixture to coagulate the rubber. It is very important in this step that the slurry of lignin-rubber particles be added to the latex rather than the latex added to the slurry. If the latex is added to the slurry very poor dispersion results and a milky, slimy crumb is obtained which is very difficult to filter and be handled further. Where a very small amount of latex is employed in this second coagulation, it has been found desirable to dilute the normally obtained latices with water in order to obtain adequate disposition of the latex on the particles in the slurry. This dilution may be as high as one part latex to five parts water, however, it is generally preferable not to dilute one part of the latex with more than one part of water.

The crumb which is obtained after coagulation of the final portion of the latex is very easily filtered and washed and can be very easily dewatered using a minimum amount of pressure. After dewatering, the crumb will normally contain anywhere from 40 to 65% solids which means that only about one-half to one pound of water must be dried from the crumb per pound of lignin-rubber.

The practice of this invention is more fully illustrated in the following examples. In these examples, coprecipitates were prepared containing a lignin loading of 50 parts by weight of lignin per 100 parts by weight of rubber.

The first example shows the use of equal quantities of the latex in the initial coprecipitation and the final coagulation. The lignin employed in this example was the sodium salt of a kraft pine lignin sold under the trademark "Indulin B" by the West Virginia Pulp and Paper Company.

Example 1

180 grams of moist sodium lignate, equivalent to 150 grams of lignin, were dissolved in 600 ml. of water at a temperature of 175° F. To this lignate solution 800 ml. of a butadiene styrene latex (Copo 2110 sold by the Copolymer Rubber and Chemical Corporation) were added. This rubber latex contained 150 grams of rubber solids. The mixture of the latex and lignate solution was agitated to produce a uniform blend which was slowly poured into 2000 ml. of water containing 17 ml. of concentrated (78%) sulfuric acid (at a temperature of 190 to 200° F.). The addition of the lignin-latex mixture to the acid water caused coprecipitation of these materials to form a dilute slurry of relatively small particles. The temperature after coprecipitation was 120° F. Steam of about 15 p.s.i. pressure was slowly passed through the slurry to provide only limited agitation. By this means the temperature of the slurry was raised to 195° F. During the heating the finely divided lignin-rubber particles agglomerated into larger masses which settled rapidly from the supernatant liquid. After heating had been discontinued the agglomerated lignin-rubber masses were allowed to settle and 1920 ml. of the supernatant liquid was decanted from the slurry. The pH of the remaining slurry was found to be 2.6. This slurrry was then added to 800 ml. of latex. The acidity of the slurry caused most of the rubber in this latex to coagulate; however, to insure complete coagulation, 250 ml. of a 0.2% solution of Polyox coagulant (trademark of Union Carbide Corporation for very high molecular weight, approximately 5,000,000, polymer of ethylene oxide which is water soluble and highly effective as a coagulant) were added. The pH of the slurry after complete coagulation of the latex was 3.2. The slurry was filtered and washed on an 18-mesh screen until the pH of the wash water became 7.0. The filter cake or crumb was very similar in nature to that of normally coagulated latex. The crumb was composed of large masses which were elastic in nature instead of the silt-like fragile crumb obtained by standard lignin-latex coprecipitation processes. The crumb was dewatered in a Buchner funnel employing a rubber dam and a vacuum of about 12 to 15 inches of mercury. The solids content of the dewatered crumb was 63.8% as determined by drying the crumb at 200° F. for twelve hours.

As has been mentioned, the heating of the lignin-rubber coprecipitate slurry may affect the physical properties of the resultant cured reinforced rubber unless a heat resistant lignin is employed or careful control of the heating is maintained. Since higher heat treatment temperatures generally result in higher solids, it is generally most desirable to practice this invention utilizing a heat resistant lignin. The following examples illustrate the employment of heat resistant lignins in the present process. Example 2 shows the use of an oxidized lignin with natural rubber latex.

Example 2

2160 grams of an oxidized lignin solution (produced by blowing air through an alkaline solution of lignin at pH 11 for 24 hours) containing 315 grams of lignin were mixed with 1400 ml. of a 38% solids natural rubber latex containing 532 grams of rubber solids. This mixture was added to 4000 ml. of water containing 50 ml. of concentrated 78% sulfuric acid at room temperature, resulting in coprecipitation of the lignin and latex in a finely divided particulate form. The slurry of lignin-rubber coprecipitate was then heated to 220° F. under slight pressure by passing steam through the slurry after the particles had settled. The heated slurry after cooling was then added to 140 grams of natural rubber latex diluted with 300 ml. of water containing about 53 grams of rubber solids whereupon most of the rubber in the latex coagulated on the lignin-rubber coprecipitate particles. Any residual rubber which was still emulsified was coagulated by the addition of 7000 ml. of a 0.2% aqueous solution of Polyox coagulant. The slurry of crumb particles was filtered and washed to a pH of 3.9. Dewatering of this crumb utilizing a Buchner funnel with a rubber dam and a vacuum of about 12 inches yielded a crumb of approximately 42% solids. The crumb was much like that obtained in Example 1 and washed and filtered very readily. The crumb was composed of relatively large masses which were very elastic in nature.

The series of examples below show the process of the present invention wherein the quantity of rubber solids employed in the secondary coagulation was varied from about 13% to about 400% of the quantity of rubber solids employed in the initial coprecipitation. The lignin employed in these examples was a kraft pine sodium lignate which was oxidized by blowing air through the black liquor containing the lignin for 24 hours prior to recovery of the lignin. In the following example the rubber solids employed in the secondary coagulation were equal to 400% of the rubber solids employed in the initial coprecipitation.

Example 3

1176 grams of an aqueous solution of sodium lignate containing 150 grams of lignin were mixed wtih 300 ml. of butadiene styrene latex containing 60 grams of rubber solids. This mixture was heated to 140° F. and added to 500 ml. of water containing 17 ml. of concentrated sulfuric acid which caused coprecipitation of the lignin and latex to form a slurry. This slurry was heated to 195° F. by direct steam injection. The pH of the slurry after heating was 2.4. The coprecipitate particles were permitted to settle and 1380 ml. of supernatant liquid were decanted. The slurry was then added to 1200 ml. of additional latex containing 240 grams of rubber solids. Most of the latex coagulated upon the addition of the acid slurry, however, any remaining uncoagulated latex was coagulated by the addition of 800 ml. of a 10% sodium chloride solution. The coprecipitate was then filtered, washed to a pH of 6.5 and dewatered using a Buchner funnel with a rubber dam as in Example 1. The crumb obtained was very similar to that obtained in Example 1 and had a solids content of 62.6%.

The quantity of rubber solids used in the secondary coagulation were equal to 100% of the rubber solids employed in the initial coprecipitation in the following example.

Example 4

800 grams of an aqueous solution containing 150 grams of lignin were mixed with 800 ml. of a butadiene styrene latex (Copo 2110) containing 150 grams of rubber solids. 500 ml. of water containing 21 ml. of 78% sulfuric acid were added to the lignin latex mixture with good agitation. The resultant slurry of coprecipitated lignin-rubber particles was heated to 195° F. with direct steam and 1200 ml. of supernatant liquor removed by decantation. The pH of the remaining slurry was 3.6.

This slurry was added to 800 ml. of additional latex mixed with 400 ml. of additional latex mixed with 400 ml. of water. 250 ml. of water containing 2 ml. of concentrated sulfuric acid and 30 ml. of 0.2% Polyox coagulant solution were added to completely precipitate all latex. The resultant crumb was similar to that of Example 1 and washed and filtered very easily. After dewatering the solids content of the crumb was 50.5%.

The quantity of rubber solids employed in the secondary coagulation was equal to 50% of the rubber solids employed in the initial coprecipitation in the following example.

*Example 5*

850 grams of an oxidized sodium lignate solution were mixed with 1000 ml. of butadiene styrene latex containing 187 grams of rubber solids. To this mixture while at 75° F. was added 500 ml. of water containing 23 ml. of 78% sulfuric acid at 75° F. The resultant coprecipitate slurry was heated directly with steam to 195° F. After heating 1150 ml. of supernatant liquor were decanted from the slurry. The pH of the concentrated slurry was 3.0. The slurry was then added to a mixture of 600 ml. of latex containing 123 grams rubber solids and 400 ml. of water. 175 ml. of 0.2% Polyox coagulant were added to the mixture to complete the coagulation of the latex. The resultant crumb was similar to that of Example 1 and was easily filtered, washed, and dewatered. The solids content of the crumb after dewatering was 61.0%.

In the following example only 13% of the rubber solids employed in the initial coprecipitation were employed in the secondary coagulation.

*Example 6*

850 grams of an oxidized sodium lignate solution containing 150 grams of lignin were mixed with 1400 ml. of the butadiene styrene latex employed in Example 1 containing 262 grams of rubber solids. The temperature of the lignin latex mixture was 75° F. The lignin latex mixture was added to 2000 ml. of water at 75° F. containing 22 ml. of 78% sulfuric acid. The resultant slurry of coprecipitate particles were heated to 195° F. and after the agglomerated particles had been permitted to settle, 3100 ml. of supernatant liquor were decanted from the slurry. The pH of the thickened slurry was 3.2. The thickened slurry was then added to a mixture of 200 ml. of latex and 800 ml. of water containing 38 grams of rubber solids. Most of the latex coagulated when contacted with the slurry; however, 1 ml. of 78% sulfuric acid and 240 ml. of Polyox were added to insure complete coagulation of the latex. The resultant crumb was filtered, washed and dewatered as in Example 1, and was very similar in nature to that of Example 1. The solids content of the dewatered crumb was 52.3%.

I claim:

1. The improved method of preparing lignin-rubber coprecipitate which comprises coprecipitating a rubber latex with lignin to obtain a slurry of lignin-rubber particles, heating the slurry of lignin-rubber particles to a temperature above 170° F. which is at least 10° F. above the temperature at which the coprecipitation was conducted, adding the slurry of lignin-rubber particles after said heating to additional rubber latex containing rubber solids equal to at least 5% by weight of the rubber solids employed in the initial coprecipitation, and coagulating the additional latex.

2. The method of claim 1 wherein the heated slurry of lignin-rubber particles is added to additional latex containing rubber solids equivalent to between about 10% and 100% by weight of the weight of the rubber solids employed in the initial coprecipitation.

3. The method of claim 1 wherein the slurry of lignin-rubber particles is heated to a temperature below that at which substantial fusion of the lignin occurs.

4. The method of claim 1 wherein the coprecipitation of the rubber latex and lignin is carried out at a pH between approximately 2 and 3.

5. The method of claim 1 wherein the rubber latex is a latex of butadiene styrene rubber.

6. The improved method of preparing lignin-rubber coprecipitate which comprises coprecipitating a rubber latex with lignin to obtain a slurry of lignin-rubber particles, heating the slurry of lignin-rubber particles to a temperature above 170° F. which is at least 10° F. above the temperature at which the coprecipitation was conducted, thereafter removing from about 35 to 100% of the supernatant liquid contained in the slurry of lignin-rubber particles, adding the thus thickened slurry of lignin-rubber particles to additional latex containing rubber solids equivalent to not less than 10% by weight of the weight of the rubber solids employed in the initial coprecipitation, and coagulating the additional latex.

7. The method of claim 6 wherein the slurry of lignin-rubber particles is heated to above 185° F. and the lignin contained in the slurry of lignin-rubber particles being heated is a heat resistant type of lignin.

8. The improved method of preparing lignin-rubber coprecipitate which comprises coprecipitating a rubber latex with lignin at a temperature below approximately 150° F. to obtain a slurry of lignin-rubber particles, heating the slurry of lignin-rubber particles to a temperature above 170° F., adding the slurry of lignin-rubber particles after said heating to additional rubber latex containing rubber solids equivalent to not less than 5% by weight of the weight of the rubber solids employed in the initial coprecipitation and coagulating the additional latex.

9. The method of claim 6 wherein approximately 35 to 100% of the supernatant liquid contained in the heated slurry of lignin-rubber particles is removed prior to the addition of said slurry to the additional latex.

References Cited in the file of this patent

UNITED STATES PATENTS

| | | |
|---|---|---|
| 2,608,537 | Pollak | Aug. 26, 1952 |
| 2,610,954 | Raff et al. | Sept. 16, 1952 |
| 2,844,548 | Haxo | July 22, 1958 |
| 2,844,549 | Provost | July 22, 1958 |
| 2,845,397 | Mills | July 29, 1958 |